(12) United States Patent
Ito et al.

(10) Patent No.: US 9,731,620 B2
(45) Date of Patent: Aug. 15, 2017

(54) DRIVE DEVICE, ENERGY STORAGE CONTROL METHOD FOR DRIVE DEVICE, AND TRANSPORT APPARATUS

(71) Applicant: HONDA MOTOR CO., LTD., Tokyo (JP)

(72) Inventors: Yoshihiro Ito, Wako (JP); Daijiro Takizawa, Wako (JP); Masahiro Shimada, Wako (JP); Hirokazu Oguma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/239,835

(22) Filed: Aug. 18, 2016

(65) Prior Publication Data

US 2017/0054403 A1     Feb. 23, 2017

(30) Foreign Application Priority Data

Aug. 19, 2015   (JP) ................................ 2015-162171

(51) Int. Cl.
*H02P 1/00*    (2006.01)
*B60L 11/18*   (2006.01)

(52) U.S. Cl.
CPC ....... *B60L 11/1868* (2013.01); *B60L 11/1803* (2013.01)

(58) Field of Classification Search
CPC .. H02P 27/06; H02P 2201/09; H02P 2201/07; H02P 2201/11; H02P 27/08; H02P 3/14; H02P 5/00; H02P 9/04; H02P 9/06; H02P 9/48; H02P 31/00; H02P 5/747

USPC ........ 318/139, 400.09, 400.11; 307/10.1, 77, 307/82
See application file for complete search history.

(56) References Cited

U.S. PATENT DOCUMENTS

| | | | | |
|---|---|---|---|---|
| 6,611,127 B2 * | 8/2003 | Arimitsu | ................. | B60L 11/12 318/139 |
| 7,932,633 B2 * | 4/2011 | King | .................... | B60L 11/123 180/165 |
| 8,080,973 B2 * | 12/2011 | King | ................... | B60L 11/1803 320/104 |
| 8,421,271 B2 * | 4/2013 | King | ................... | B60L 11/1811 307/82 |
| 8,653,696 B2 * | 2/2014 | King | .................... | B60L 11/123 307/82 |

(Continued)

FOREIGN PATENT DOCUMENTS

JP      2015-061369      3/2015

*Primary Examiner* — Paul Ip
(74) *Attorney, Agent, or Firm* — Mori & Ward, LLP

(57) ABSTRACT

A motor is to be driven with power supplied from at least one of a first energy storage and a second energy storage. The booster is to boost a first voltage output from the first energy storage such that the first voltage and a second voltage output from the second energy storage satisfy a first condition, a second condition, and a third condition. In the first condition, the second voltage does not exceed a withstand voltage limit of the motor. In the second condition, the second voltage is lower than or equal to a maximum boosted value to which the booster boosts the first voltage with a maximum boosting ratio. In the third condition, the second voltage is higher than or equal to a minimum boosted value to which the booster boosts the first voltage with a minimum boosting ratio.

18 Claims, 5 Drawing Sheets

(56) References Cited

U.S. PATENT DOCUMENTS

| | | | |
|---|---|---|---|
| 9,024,573 B2* | 5/2015 | King | B60L 11/1803 |
| | | | 320/107 |
| 9,227,523 B2* | 1/2016 | King | B60L 11/1803 |
| 9,290,097 B2* | 3/2016 | Steigerwald | B60L 3/0069 |
| 9,321,367 B2* | 4/2016 | King | B60L 11/1803 |
| 9,566,916 B2* | 2/2017 | Rao | B60R 16/02 |
| 2002/0017892 A1* | 2/2002 | Arimitsu | B60L 11/12 |
| | | | 318/801 |
| 2010/0096926 A1* | 4/2010 | King | B60L 11/123 |
| | | | 307/45 |
| 2010/0097031 A1* | 4/2010 | King | B60L 11/1803 |
| | | | 320/109 |
| 2011/0050174 A1* | 3/2011 | King | B60L 11/1811 |
| | | | 320/134 |
| 2011/0169449 A1* | 7/2011 | King | B60L 11/123 |
| | | | 320/109 |
| 2012/0038214 A1* | 2/2012 | King | B60L 11/005 |
| | | | 307/77 |
| 2012/0074774 A1* | 3/2012 | King | B60L 11/1803 |
| | | | 307/10.1 |
| 2012/0112702 A1* | 5/2012 | Steigerwald | B60L 3/0069 |
| | | | 320/137 |
| 2012/0153878 A1* | 6/2012 | King | B60L 11/1803 |
| | | | 318/139 |
| 2012/0153879 A1* | 6/2012 | King | B60L 11/1803 |
| | | | 318/139 |
| 2014/0145677 A1* | 5/2014 | King | B60L 11/123 |
| | | | 320/109 |
| 2015/0115709 A1* | 4/2015 | King | B60L 11/1803 |
| | | | 307/10.1 |

* cited by examiner

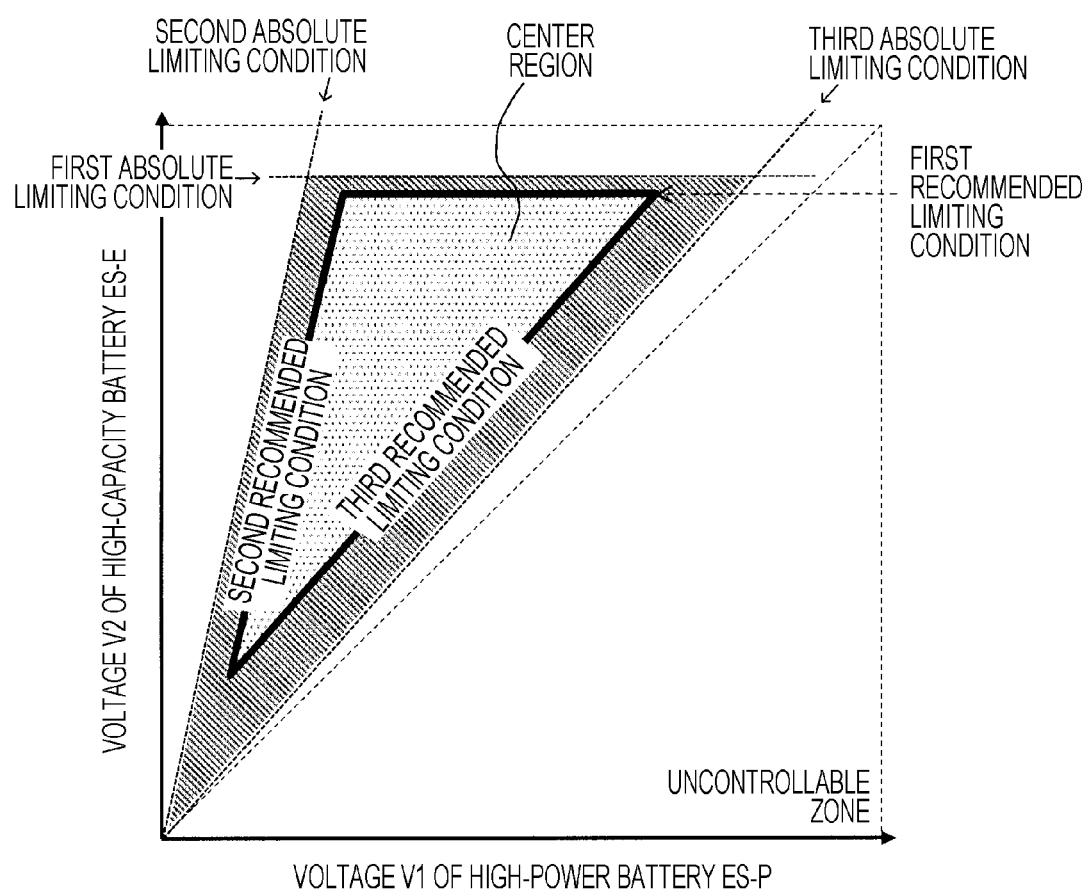

DRIVE DEVICE, ENERGY STORAGE CONTROL METHOD FOR DRIVE DEVICE, AND TRANSPORT APPARATUS

CROSS REFERENCE TO RELATED APPLICATIONS

The present application claims priority under 35 U.S.C. §119 to Japanese Patent Application No. 2015-162171, filed Aug. 19, 2015, entitled "Drive Device, Energy Storage Control Method For Drive Device, and Transport Apparatus." The contents of this application are incorporated herein by reference in their entirety.

BACKGROUND

1. Field

The present disclosure relates to a drive device, an energy storage control method for the drive device, and a transport apparatus.

2. Description of the Related Art

An electric vehicle described in Japanese Unexamined Patent Application Publication No. 2015-061369 is a so-called electric car running only on electric energy (and not using an internal combustion engine therewith). The electric vehicle includes an electric motor configured to drive wheels, first and second batteries configured to supply power to the electric motor, and a power control unit configured to control the supply of power from each battery to the electric motor.

A battery selecting method is described in Japanese Unexamined Patent Application Publication No. 2015-061369. This method first determines required motor power and required battery energy capacity. Next, on a two-dimensional battery performance map using a battery power density and a battery energy density as parameters, a straight line having a constant slope corresponding to the ratio between the required motor power and the required battery energy capacity is set as a required P/E line. Then, a first battery selected from power batteries with power densities higher than the required P/E line and a second battery selected from energy batteries with energy densities higher than the required P/E line are combined in parallel and mounted on the vehicle.

SUMMARY

According to one aspect of the present invention, a drive device includes a first energy storage, a second energy storage superior to the first energy storage in energy to weight density and inferior to the first energy storage in power to weight density, a boosting unit configured to boost an output voltage of the first energy storage to perform power distribution control, and a motor driven by power obtained from at least one of the first energy storage and the second energy storage. In a two-dimensional coordinate system using a voltage of the first energy storage and a voltage of the second energy storage as variables, a voltage point representing a relationship between the voltage of the first energy storage and the voltage of the second energy storage is within a region that satisfies all the following conditions: a first condition which is that the voltage of the second energy storage does not exceed a withstand voltage limit of the motor, a second condition which is that the voltage of the second energy storage is lower than or equal to a value obtained by the boosting unit by multiplying the voltage of the first energy storage by a maximum boosting ratio, and a third condition which is that the voltage of the second energy storage is higher than or equal to a value obtained by the boosting unit by multiplying the voltage of the first energy storage by a minimum boosting ratio.

According to another aspect of the present invention, a control method in a drive device includes a first energy storage, a second energy storage superior to the first energy storage in energy to weight density and inferior to the first energy storage in power to weight density, a boosting unit configured to boost an output voltage of the first energy storage to perform power distribution control, and a motor driven by power obtained from at least one of the first energy storage and the second energy storage. In a two-dimensional coordinate system using a voltage of the first energy storage and a voltage of the second energy storage as variables, a voltage point representing a relationship between the voltage of the first energy storage and the voltage of the second energy storage is within a region that satisfies all the following conditions: a first condition which is that the voltage of the second energy storage does not exceed a withstand voltage limit of the motor, a second condition which is that the voltage of the second energy storage is lower than or equal to a value obtained by the boosting unit by multiplying the voltage of the first energy storage by a maximum boosting ratio, and a third condition which is that the voltage of the second energy storage is higher than or equal to a value obtained by the boosting unit by multiplying the voltage of the first energy storage by a minimum boosting ratio.

According to further aspect of the present invention, a drive device includes a first energy storage, a second energy storage, a motor, and a booster. The second energy storage is superior to the first energy storage in energy to weight density and is inferior to the first energy storage in power to weight density. The motor is to be driven with power supplied from at least one of the first energy storage and the second energy storage. The booster is to boost a first voltage output from the first energy storage such that the first voltage and a second voltage output from the second energy storage satisfy conditions. The conditions includes a first condition, a second condition, and a third condition. In the first condition, the second voltage does not exceed a withstand voltage limit of the motor. In the second condition, the second voltage is lower than or equal to a maximum boosted value to which the booster boosts the first voltage with a maximum boosting ratio. In the third condition, the second voltage is higher than or equal to a minimum boosted value to which the booster boosts the first voltage with a minimum boosting ratio.

According to further aspect of the present invention, an energy storage control method for a drive device includes boosting a first voltage output from a first energy storage such that the first voltage and a second voltage output from a second energy storage satisfy conditions. The second energy storage is superior to the first energy storage in energy to weight density and inferior to the first energy storage in power to weight density. The conditions includes a first condition, a second condition, and a third condition. In the first condition, the second voltage does not exceed a withstand voltage limit of a motor. The motor is to be driven with power supplied from at least one of the first energy storage and the second energy storage. In the second condition, the second voltage is lower than or equal to a maximum boosted value to which the booster boosts the first voltage with a maximum boosting ratio. In the third condition, the second voltage is higher than or equal to a minimum

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 illustrates the absolute region and a center region that satisfies all first to third recommended limiting conditions within the controllable zone.

DESCRIPTION OF THE EMBODIMENTS

Figure 1:
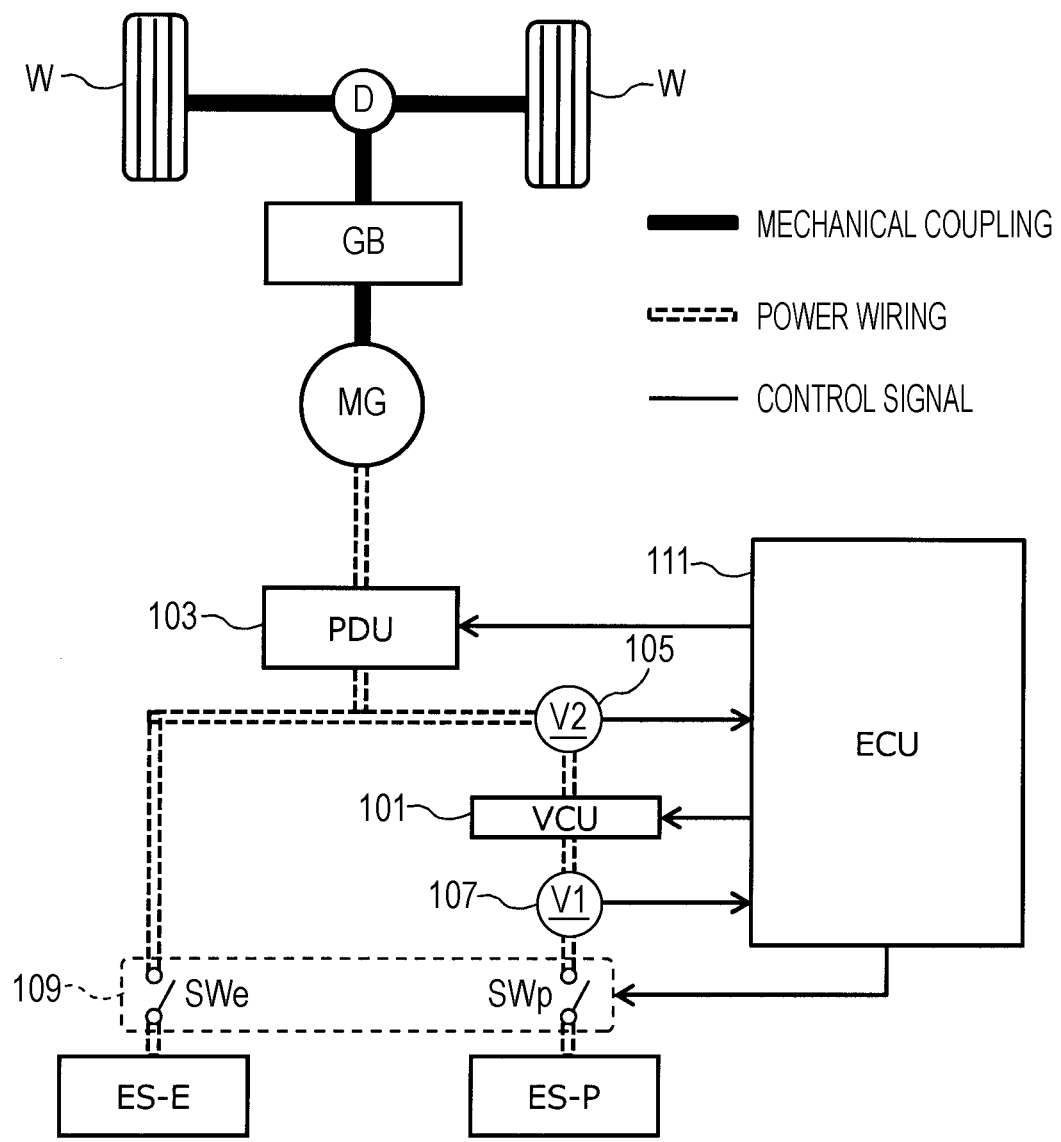
FIG. 1 is a block diagram illustrating an internal configuration of an electric vehicle.

The embodiments will now be described with reference to the accompanying drawings, wherein like reference numerals designate corresponding or identical elements throughout the various drawings.

FIG. 1 is a block diagram illustrating an internal configuration of an electric vehicle. A one-motor (1-MOT) electric vehicle illustrated in FIG. 1 includes a motor generator MG, a high-capacity battery ES-E, a high-power battery ES-P, a voltage control unit (VCU) 101, a power drive unit (PDU) 103, a V2 sensor 105, a V1 sensor 107, a switch group 109, and an electronic control unit (controller) (ECU) 111. In FIG. 1, a thick solid line represents mechanical coupling, a dotted double line represents power wiring, and a thin solid line represents a control signal.

The motor generator MG is driven by power obtained from at least one of the high-capacity battery ES-E and the high-power battery ES-P, and generates power for the electric vehicle to run. A torque generated by the motor generator MG is transmitted through a gearbox GB (variable- or fixed-stage gearbox) and a reduction gear D to drive wheels W. During speed reduction of the electric vehicle, the motor generator MG operates as a motor and outputs a braking force of the electric vehicle. Regenerative power generated by operating the motor generator MG as a motor is stored either in the high-capacity battery ES-E or the high-power battery ES-P.

The high-capacity battery ES-E includes a plurality of rechargeable cells, such as lithium-ion batteries or nickel-metal hydride batteries, and supplies high-voltage power to the motor generator MG. The high-power battery ES-P also includes a plurality of rechargeable cells, such as lithium-ion batteries or nickel-metal hydride batteries, and supplies high-voltage power through the VCU 101 (a booster) to the motor generator MG. The high-power battery ES-P and the high-capacity battery ES-E are connected in parallel to the PDU 103, with the VCU 101 interposed between the high-power battery ES-P and the PDU 103. The voltage of the high-power battery ES-P (a first voltage) is lower than the voltage of the high-capacity battery ES-E (a second voltage). Therefore, the power of the high-power battery ES-P is boosted by the VCU 101 to the level of the voltage of the high-capacity battery ES-E, and then supplied through the PDU 103 to the motor generator MG.

Note that the high-capacity battery ES-E and the high-power battery ES-P are not limited to secondary batteries, such as the lithium-ion batteries or nickel-metal hydride batteries described above, or fuel cells or air cells that require external supply of active materials. For example, while being small in storage capacity, a capacitor capable of charging and discharging a large amount of power in a short time may be used as the high-power battery ES-P.

The high-capacity battery ES-E and the high-power battery ES-P differ in characteristics. The high-capacity battery ES-E is lower in power to weight density but higher in energy to weight density than the high-power battery ES-P. Conversely, the high-power battery ES-P is lower in energy to weight density but higher in power to weight density than the high-capacity battery ES-E. Thus, the high-capacity battery ES-E is superior in energy to weight density, and the high-power battery ES-P is superior in power to weight density. Note that the energy to weight density is energy per unit weight (Wh/kg), and the power to weight density is power per unit weight (W/kg). Therefore, the high-capacity battery ES-E superior in energy to weight density is an energy storage which is primarily intended to achieve high capacity, and the high-power battery ES-P superior in power to weight density is an energy storage which is primarily intended to achieve high power.

The differences in characteristics between the high-capacity battery ES-E and the high-power battery ES-P are caused by various parameters determined, for example, by the structure and materials of battery components, such as electrodes, active materials, and electrolyte. For example, the high-capacity battery ES-E is superior to the high-power battery ES-P in storage capacity, which is a parameter indicating the total amount of electricity that can be charged and discharged. On the other hand, the high-power battery ES-P is superior to the high-capacity battery ES-E in rate characteristic, which is a parameter indicating the resistance to charge and discharge cycles, and also in internal resistance (impedance), which is a parameter indicating the value of electrical resistance to charge and discharge cycles.

Figure 2:
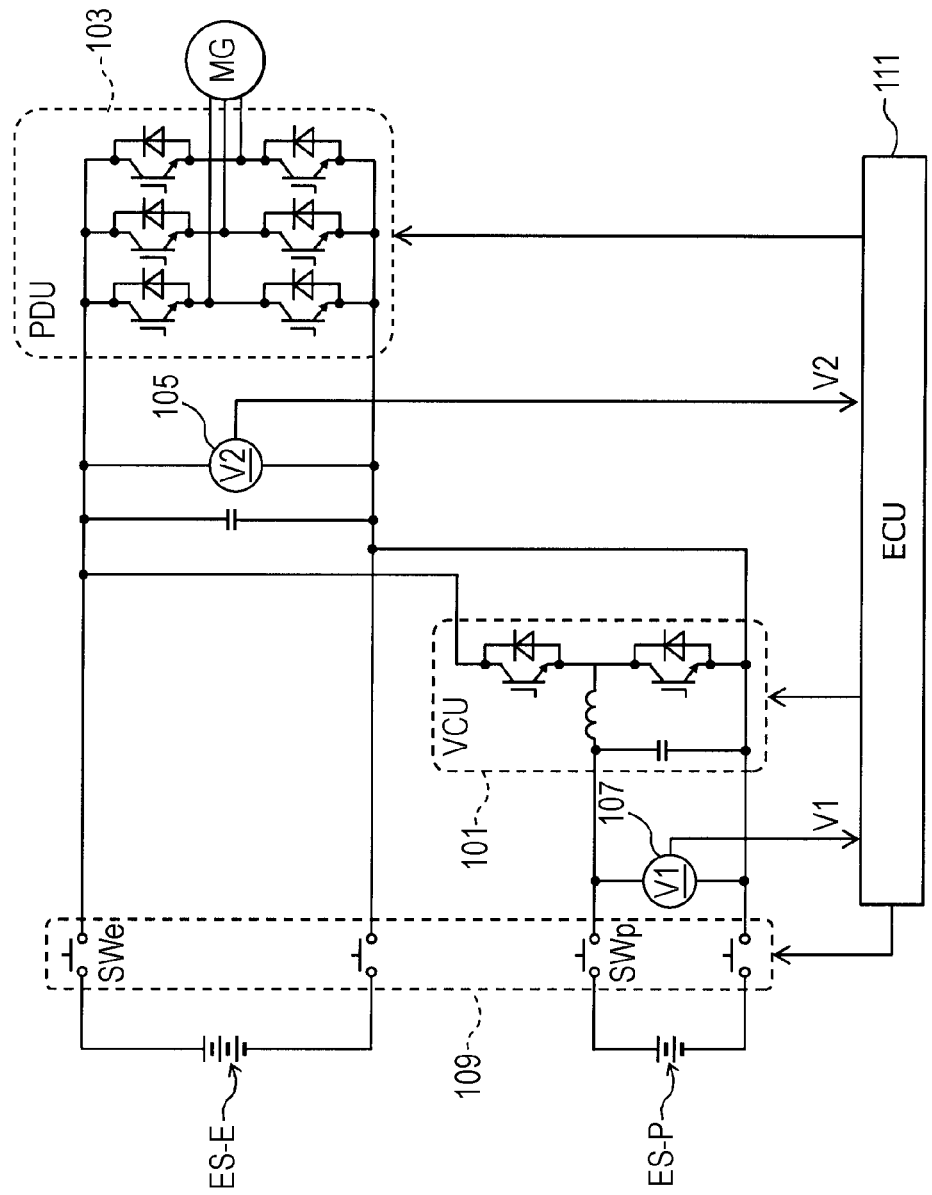
FIG. 2 is an electrical diagram illustrating how a high-capacity battery, a high-power battery, a VCU, a PDU, and a motor generator relate to one another.

The VCU 101 boosts the output voltage of the high-power battery ES-P without converting it from a direct-current (DC) voltage. During speed reduction of the electric vehicle, the VCU 101 lowers the voltage of power generated by the motor generator MG and converted to a DC voltage. The power lowered in voltage by the VCU 101 is charged into the high-power battery ES-P. FIG. 2 is an electrical diagram illustrating how the high-capacity battery ES-E, the high-power battery ES-P, the VCU 101, the PDU 103, and the motor generator MG relate to one another. As illustrated in FIG. 2, the VCU 101 boosts the voltage V1 of the high-power battery ES-P (input voltage) to the level of the voltage V2 of the high-capacity battery ES-E by switching on and off two switching elements thereof.

The PDU 103 converts a DC voltage to an alternating-current (AC) voltage to supply a three-phase current to the motor generator MG. During speed reduction of the electric vehicle, the PDU 103 converts an AC voltage generated by the motor generator MG to a DC voltage.

The V2 sensor 105 detects the voltage V2 of the high-capacity battery ES-E. The voltage V2 detected by the V2 sensor 105 is equal to a value obtained by the VCU 101 by boosting the voltage V1 of the high-power battery ES-P. A signal representing the voltage V2 detected by the V2 sensor 105 is transmitted to the ECU 111. The V1 sensor 107 detects the voltage V1 of the high-power battery ES-P. A signal representing the voltage V1 detected by the V1 sensor 107 is transmitted to the ECU 111.

The switch group 109 includes a switch SWe for opening and closing a current path extending from the high-capacity battery ES-E to the PDU 103, and a switch SWp for opening and closing a current path extending from the high-power battery ES-P to the VCU 101. The switches SWe and SWp are each turned on or off in response to a result of battery selection by the ECU 111.

The ECU 111 controls the VCU 101 configured to perform power distribution control (described below) and the PDU 103, controls the charge and discharge between the motor generator MG and the high-power battery ES-P and high-capacity battery ES-E, and controls the ON and OFF of the switch group 109. The details of the ECU 111 will be described later on.

Next, how the high-capacity battery ES-E and the high-power battery ES-P are used will be described.

The high-power battery ES-P supplies power to the motor generator MG when a large driving force is required for travel of the electric vehicle. The high-capacity battery ES-E supplies constant power to the motor generator MG at all times during travel of the electric vehicle. Regenerative power generated by the motor generator MG is preferentially input to the high-power battery ES-P. As a result, the state of charge (SOC) of the high-capacity battery ES-E continuously decreases as the electric vehicle travels. On the other hand, the SOC of the high-power battery ES-P stays at around an intermediate value.

A control operation that allows exchange of power with the motor generator MG or the other battery by taking advantage of the different characteristics of the high-power battery ES-P and the high-capacity battery ES-E, as described above, is referred to as "power distribution control". In the present embodiment, the power distribution control is performed by the VCU 101 by boosting or lowering the voltage of power input to, and output from, the high-power battery ES-P.

Figure 3:
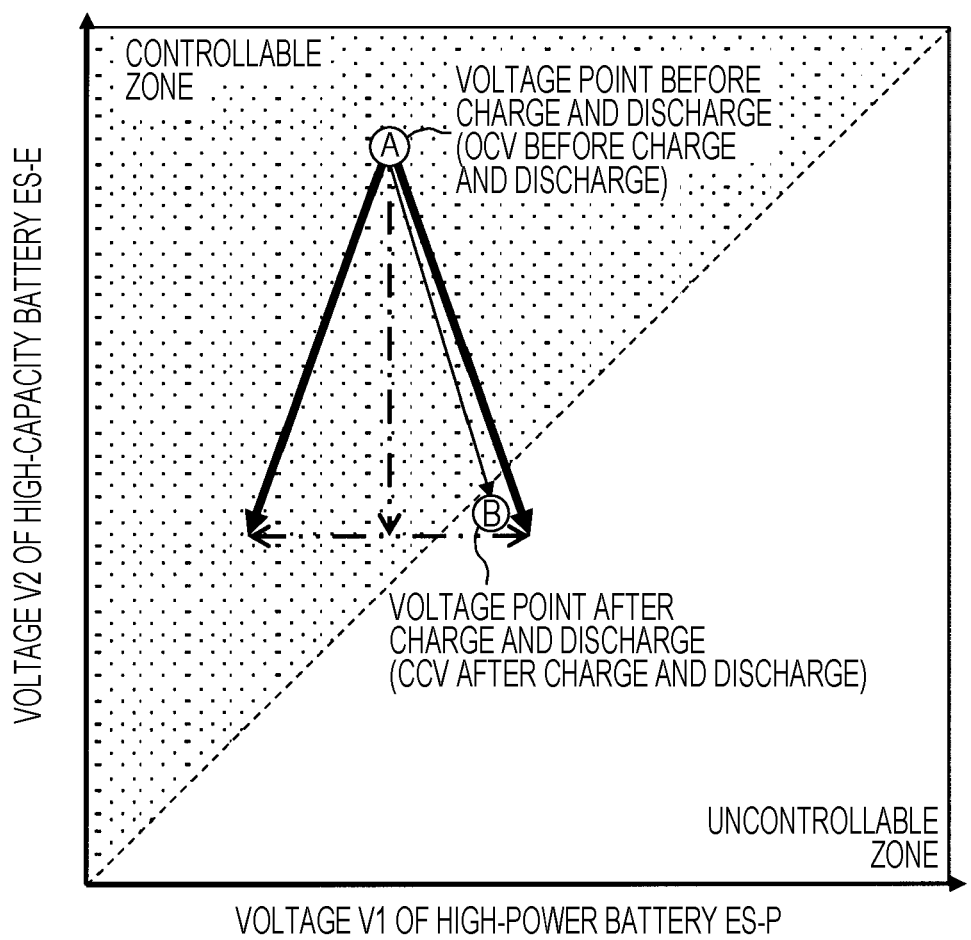
FIG. 3 illustrates two zones based on the relationship between the voltage of the high-capacity battery and the voltage of the high-power battery, and also illustrates how a voltage point moves from "before" to "after" charge and discharge.

In the electric vehicle of the present embodiment, the high-capacity battery ES-E and the high-power battery ES-P are connected in parallel to the PDU 103. While the voltage V2 of the high-capacity battery ES-E is directly input to the PDU 103, the voltage V1 of the high-power battery ES-P lower than the voltage V2 of the high-capacity battery ES-E is input to the PDU 103 after being boosted by the VCU 101 to the level of the voltage V2 of the high-capacity battery ES-E. Therefore, if the voltage V2 of the high-capacity battery ES-E is not higher than the voltage V1 of the high-power battery ES-P, control over the configuration of at least the present embodiment is not established and fails. FIG. 3 illustrates two zones based on the relationship between the voltage V2 of the high-capacity battery ES-E and the voltage V1 of the high-power battery ES-P. Of the two zones, a shaded zone is referred to as "controllable zone", and a non-shaded zone is referred to as "uncontrollable zone".

In FIG. 3, a region where the voltage V2 of the high-capacity battery ES-E is higher than the voltage V1 of the high-power battery ES-P is collectively defined as the "controllable zone". However, as described below, it is necessary in practice to take into account the maximum boosting ratio and the minimum boosting ratio of the VCU 101 that are greater than one. The "controllable zone" which takes into account these boosting ratios is located inside, and is smaller than, the "controllable zone" in FIG. 3.

FIG. 3 shows a two-dimensional coordinate system using the voltage V1 of the high-power battery ES-P and the voltage V2 of the high-capacity battery ES-E as variables. In FIG. 3, the horizontal axis represents the voltage V1 of the high-power battery ES-P, and the vertical axis represents the voltage V2 of the high-capacity battery ES-E. In the two-dimensional coordinate system, the voltage V2 of the high-capacity battery ES-E increases upward, and is shifted upward by charge or regeneration and shifted downward by discharge. Also in the two-dimensional coordinate system, the voltage V1 of the high-power battery ES-P increases to the right, and is shifted to the right by charge or regeneration and shifted to the left by discharge.

As described above, the two-dimensional coordinate system of FIG. 3 uses the voltage V1 of the high-power battery ES-P and the voltage V2 of the high-capacity battery ES-E as variables. Therefore, a point (hereinafter referred to as "voltage point") representing the relationship between the voltage V2 of the high-capacity battery ES-E and the voltage V1 of the high-power battery ES-P is moved in the two-dimensional coordinate system by charge and discharge of the high-capacity battery ES-E and the high-power battery ES-P.

For example, when the high-capacity battery ES-E is discharged and the high-power battery ES-P is charged or regenerated, the voltage point is represented by a vector directed toward the lower right. Specifically, the vector combines the downward movement associated with the discharge of the high-capacity battery ES-E and the rightward movement associated with the charge or regeneration of the high-power battery ES-P. In this case, the voltage point may enter the uncontrollable zone. On the other hand, when the high-capacity battery ES-E and the high-power battery ES-P are discharged, the voltage point is represented by a vector directed toward the lower left. Specifically, the vector combines the downward movement associated with the discharge of the high-capacity battery ES-E and the leftward movement associated with the discharge of the high-power battery ES-P.

As described above, the SOC of the high-capacity battery ES-E continuously decreases, whereas the SOC of the high-power battery ES-P stays at around an intermediate value. Thus, the voltage V2 of the high-capacity battery ES-E decreases as indicated by a dot-and-dash arrow in FIG. 3, and the voltage V1 of the high-power battery ES-P varies around a predetermined value as indicated by a two-dot chain arrow in FIG. 3. Therefore, as the charge and discharge of these two batteries progresses, the voltage point tends to move toward a range defined by two vectors indicated by thick lines. Assume that the electric vehicle starts to run when the voltages of the two batteries that are not yet charged or discharged (open circuit voltages or OCVs) have a relationship represented by voltage point A in FIG. 3. In this case, when the charge and discharge of the two batteries progresses, the voltages of the two charged and discharged batteries (closed circuit voltages or CCVs) may have a relationship represented by voltage point B in FIG. 3. As a result, control over the configuration of the present embodiment may not be established and may fail.

In the present embodiment, to minimize the possibility that the voltage point representing the relationship between the voltage V2 of the high-capacity battery ES-E and the voltage V1 of the high-power battery ES-P will enter the uncontrollable zone illustrated in FIG. 3, control is performed such that the voltage point is within the controllable zone.

Example 1

Figure 4:
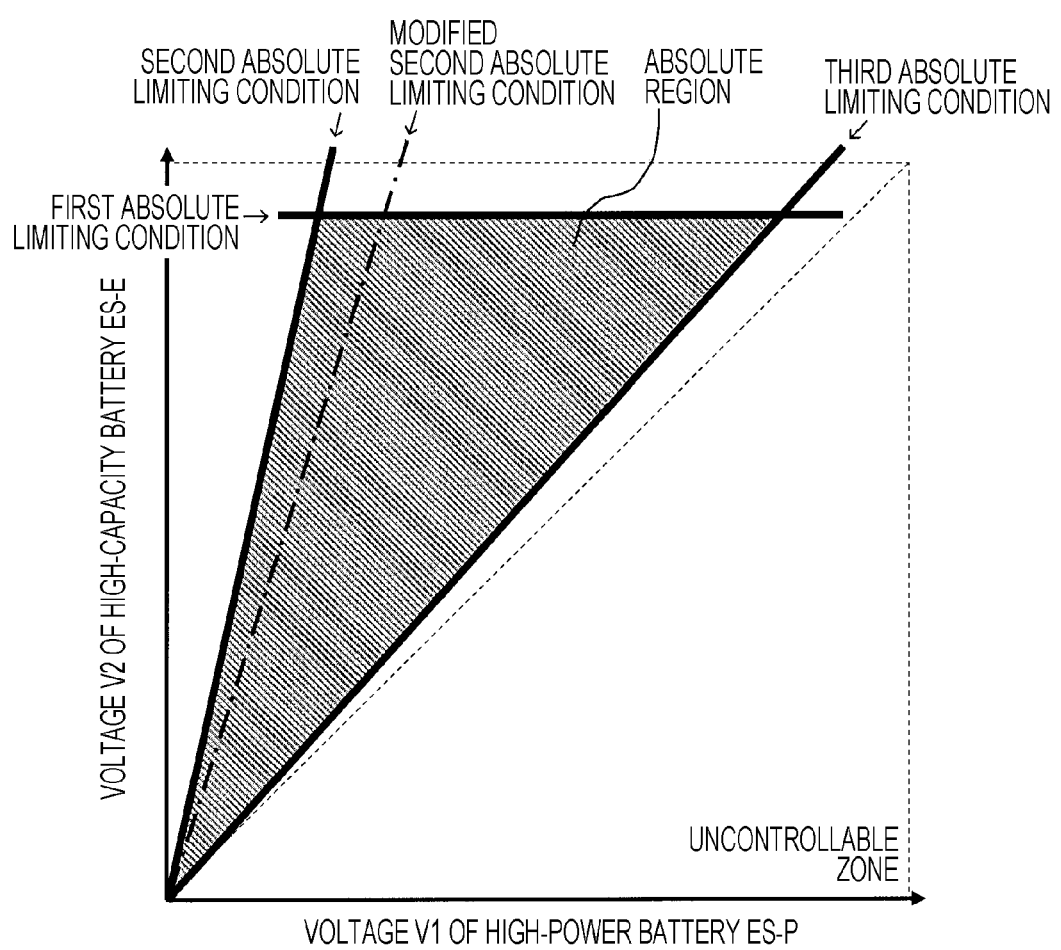
FIG. 4 illustrates an absolute region that satisfies all first to third absolute limiting conditions within a controllable zone.

In Example 1, a voltage point representing the relationship between the voltage V2 of the high-capacity battery ES-E and the voltage V1 of the high-power battery ES-P is to be within a hatched region in FIG. 4. This region (hereinafter referred to as "absolute region") satisfies all first to third absolute limiting conditions.

The first absolute limiting condition is that the voltage V2 of the high-capacity battery ES-E does not exceed the withstand voltage limits of the motor generator MG and the PDU 103. As illustrated in FIG. 2, there is no voltage regulator between the high-capacity battery ES-E and the motor generator MG and PDU 103. This means that the motor generator MG and the PDU 103 cannot be protected if the voltage V2 of the high-capacity battery ES-E exceeds the withstand voltage limits of the motor generator MG and the PDU 103.

The second absolute limiting condition is that the voltage V2 of the high-capacity battery ES-E is lower than or equal to a value (a maximum boosted value) obtained by the VCU 101 by multiplying the voltage V1 of the high-power battery ES-P by a boosting ratio of 4 (V2≤4×V1). This boosting ratio, 4, is an exemplary maximum value (maximum boosting ratio) at which the capability to establish control over the VCU 101 can be ensured with high probability. Ensuring the capability to establish control over the VCU 101 means to ensure linearity of the boosting ratio with respect to the duty ratio of the VCU 101 which is pulse width modulation (PWM)-controlled. If the voltage V2 of the high-capacity battery ES-E is higher than a value obtained by multiplying the voltage V1 of the high-power battery ES-P by the maximum boosting ratio, the high-power battery ES-P cannot supply power to the high-capacity battery ES-E and the motor generator MG, and hence the control fails.

The maximum boosting ratio varies depending on the VCU 101. This means that selection of the high-capacity battery ES-E and the high-power battery ES-P needs to be preceded by selection of the VCU 101. In other words, together with the third absolute limiting condition (described below), the performance of the selected VCU 101 has a dominant influence on the selection of the high-capacity battery ES-E and the high-power battery ES-P.

The third absolute limiting condition is that the voltage V2 of the high-capacity battery ES-E is higher than or equal to a value (a minimum boosted value) obtained by the VCU 101 by multiplying the voltage V1 of the high-power battery ES-P by a boosting ratio of 1.09 (V2≤1.09×V1). This boosting ratio, 1.09, is an exemplary minimum boosting ratio of the VCU 101 and varies depending on the VCU 101. This boosting ratio can be obtained by adding up the tolerance of a chip forming the VCU 101, the detection error of the V2 sensor 105, and the detection error of the V1 sensor 107. If the voltage V2 of the high-capacity battery ES-E is lower than a value obtained by multiplying the voltage V1 of the high-power battery ES-P by the minimum boosting ratio, the high-capacity battery ES-E cannot supply power to the high-power battery ES-P and the motor generator MG, and hence the control fails. The minimum boosting ratio of the VCU 101 is inevitably produced by individual variation of the VCU 101.

In Example 1, batteries are selected such that the voltage point is within the absolute region (hatched region in FIG. 4) satisfying all the first to third absolute limiting conditions in the controllable zone. Thus, even when the high-power battery ES-P and the high-capacity battery ES-E are charged and discharged, it is possible to restrict the movement of the voltage point representing the relationship between the voltage V1 of the high-power battery ES-P and the voltage V2 of the high-capacity battery ES-E, from the controllable zone to the uncontrollable zone. Therefore, even when these two batteries are charged and discharged, it is possible to ensure the capability to establish control related to the charge and discharge of the two batteries. When the voltage point is within the region that satisfies all the first to third absolute limiting conditions, the high-power battery ES-P can exchange power with the high-capacity battery ES-E and the motor generator MG through the VCU 101. Thus, control related to charge and discharge is established, which takes advantage of the different characteristics of the high-power battery ES-P and the high-capacity battery ES-E.

Instead of the second absolute limiting condition, a modified second absolute limiting condition indicated by a dot-and-dash line in FIG. 4 may be used. The modified second absolute limiting condition is that the voltage V2 of the high-capacity battery ES-E is lower than or equal to a value obtained by the VCU 101 by multiplying the voltage V1 of the high-power battery ES-P by a boosting ratio of 3 (V2≤3×V1). This boosting ratio, 3, is an exemplary maximum value at which the capability to establish control over the VCU 101 can be reliably ensured. Using the modified second absolute limiting condition, instead of the second absolute limiting condition, reduces the number of selectable combinations of the high-capacity battery ES-E and the high-power battery ES-P, but improves the stability of control. Additionally, since the voltage point becomes closer to the center of the controllable zone, the capability to establish the control can be more reliably ensured.

Example 2

In Example 2, a voltage point representing the relationship between the voltage V2 of the high-capacity battery ES-E and the voltage V1 of the high-power battery ES-P is to be within a dotted region in FIG. 5. This region (hereinafter referred to as "center region") satisfies all first to third recommended limiting conditions. The first recommended limiting condition (a first additional condition) is that the voltage V2 of the high-capacity battery ES-E is lower than or equal to a value obtained by setting a margin from the first absolute limiting condition (described in Example 1) toward the inside of the controllable zone. The second recommended limiting condition (a second additional condition) is that the voltage V2 of the high-capacity battery ES-E is lower than or equal to a value obtained by setting a margin from the second absolute limiting condition (described in Example 1) toward the inside of the controllable zone such that the boosting ratio of the VCU 101 is decreased. The third recommended limiting condition (a third additional condition) is that the voltage V2 of the high-capacity battery ES-E is higher than or equal to a value obtained by setting a margin from the third absolute limiting condition (described in Example 1) toward the inside of the controllable zone such that the boosting ratio of the VCU 101 is increased.

Although the second recommended limiting condition is set on the basis of the second absolute limiting condition in FIG. 5, the modified second absolute limiting condition may be used instead of the second absolute limiting condition. Setting the second recommended limiting condition on the basis of the modified second absolute limiting condition, instead of the second absolute limiting condition, reduces the number of selectable combinations of the high-capacity battery ES-E and the high-power battery ES-P, but improves the stability of control. Additionally, since the voltage point becomes closer to the center of the controllable zone, the capability to establish the control can be more reliably ensured.

The margin set between the first absolute limiting condition and the first recommended limiting condition is hereinafter referred to as "first margin". The margin set between the second absolute limiting condition and the second recommended limiting condition is hereinafter referred to as "second margin". The margin set between the third absolute limiting condition and the third recommended limiting condition is hereinafter referred to as "third margin". Of these three margins, the first margin is the smallest, the third margin is the largest, and the second margin is between the first margin and the third margin in size. These size differences of the margins are based on the tendency of movement of the voltage point illustrated in FIG. 3.

As described above, the regenerative power generated by the motor generator MG is preferentially input to the high-power battery ES-P. Therefore, as the charge and discharge of the two batteries progresses, it becomes difficult for the voltage point to move in the direction in which the voltage V2 increases. Hence, the first margin is the smallest as described above.

The SOC of the high-power battery ES-P stays at around an intermediate value, whereas the SOC of the high-capacity battery ES-E continuously decreases as the electric vehicle travels. Therefore, the smaller the slope of a line representing a condition in FIG. 4, the more likely a voltage point satisfying the condition is to be moved out of the center region by the charge and discharge of the high-capacity battery ES-E and the high-power battery ES-P.

The slope of the line representing the second absolute limiting condition in FIG. 4 is 4 (or 3 in the case of using the modified second absolute limiting condition), and the slope of the line representing the third absolute limiting condition in FIG. 4 is 1.09. Hence, the slope of the line representing the third absolute limiting condition is the smallest, and the third margin is the largest.

In Example 2, batteries that supply power to the motor generator MG are selected such that the voltage point is within the center region (dotted region in FIG. 5) satisfying all the first to third recommended limiting conditions. That is, the high-power battery ES-P and the high-capacity battery ES-E are selected such that the voltage point representing the relationship between the voltage V1 of the high-power battery ES-P and the voltage V2 of the high-capacity battery ES-E is within the region located inside (and around the center of) the controllable zone and defined by adding margins to the first to third absolute limiting conditions. Therefore, even when the voltage point moves from the controllable zone toward the uncontrollable zone, the margins set near the boundary between the controllable zone and the uncontrollable zone serve as a buffer to prevent entry into the uncontrollable zone. Note that the center region illustrated in FIG. 5 is smaller in size than the absolute region illustrated in FIG. 4. At the same time, the center region, which is formed by taking into account the tendency of movement of the voltage point from "before" to "after" charge and discharge, is not similar in shape to the absolute region. Therefore, the voltage point can be reliably prevented from entering the uncontrollable zone.

In FIG. 5, larger margins are not necessarily better. The larger the first to third margins, the closer the voltage point is to the center of the controllable zone. At the same time, however, the larger the first to third margins, the smaller the number of selectable combinations of the high-capacity battery ES-E and the high-power battery ES-P. Therefore, the first to third margins need to be set appropriately in accordance with battery characteristics.

As described above, in the present embodiment, even when these two batteries are charged and discharged, the capability to establish control over the two batteries can be ensured.

The present disclosure is not limited to the embodiments described above, and appropriate modifications and improvements may be made thereto. For example, although the electric vehicle described above is a 1-MOT electric vehicle (EV), the electric vehicle may be an EV including a plurality of motor generators, a hybrid electric vehicle (HEV) including an internal combustion engine along with at least one motor generator, or a fuel cell vehicle (FCV).

A drive device according to a first aspect of the present disclosure includes a first energy storage (e.g., high-power battery ES-P in the above embodiment), a second energy storage (e.g., high-capacity battery ES-E in the above embodiment) superior to the first energy storage in energy to weight density and inferior to the first energy storage in power to weight density, a boosting unit (e.g., VCU 101 in the above embodiment) configured to boost an output voltage of the first energy storage to perform power distribution control, and a motor (e.g., motor generator MG in the above embodiment) driven by power obtained from at least one of the first energy storage and the second energy storage. In a two-dimensional coordinate system using a voltage of the first energy storage and a voltage of the second energy storage as variables, a voltage point representing a relationship between the voltage of the first energy storage and the voltage of the second energy storage is within a region that satisfies all the following conditions: a first condition (e.g., first absolute limiting condition in the above embodiment) which is that the voltage of the second energy storage does not exceed a withstand voltage limit of the motor, a second condition (e.g., second absolute limiting condition in the above embodiment) which is that the voltage of the second energy storage is lower than or equal to a value obtained by the boosting unit by multiplying the voltage of the first energy storage by a maximum boosting ratio, and a third condition (e.g., third absolute limiting condition in the above embodiment) which is that the voltage of the second energy storage is higher than or equal to a value obtained by the boosting unit by multiplying the voltage of the first energy storage by a minimum boosting ratio.

According to a second aspect of the present disclosure, in the first aspect described above, the drive device may further include a control unit (e.g., ECU 111 in the above embodiment) configured to control the boosting unit. The maximum boosting ratio may be a limit value at which a capability of the control unit to establish control over the boosting unit can be ensured.

According to a third aspect of the present disclosure, in the first aspect described above, the drive device may further include a first sensor (e.g., V1 sensor 107 in the above embodiment) configured to detect the voltage of the first energy storage, and a second sensor (e.g., V2 sensor 105 in the above embodiment) configured to detect a value obtained by the boosting unit by boosting the voltage of the first energy storage. The minimum boosting ratio may be a value based on a product tolerance of the boosting unit and detection errors of the first sensor and the second sensor.

According to a fourth aspect of the present disclosure, in the first aspect described above, the voltage point representing the relationship between the voltage of the first energy storage and the voltage of the second energy storage may be within a region that satisfies all the following conditions: a first recommended condition (e.g., first recommended limiting condition in the above embodiment) which is that the voltage of the second energy storage is lower than or equal to a value obtained by setting a first margin with respect to the first condition, a second recommended condition (e.g., second recommended limiting condition in the above embodiment) which is that the voltage of the second energy storage is lower than or equal to a value obtained by setting a second margin with respect to the second condition such that the boosting ratio of the boosting unit is decreased, and a third recommended condition (e.g., third recommended limiting condition in the above embodiment) which is that the voltage of the second energy storage is higher than or equal to a value obtained by setting a third margin with respect to the third condition such that the boosting ratio of the boosting unit is increased.

According to a fifth aspect of the present disclosure, in the fourth aspect described above, the first margin, the second margin, and the third margin may differ in size.

According to a sixth aspect of the present disclosure, in the fifth aspect described above, the first margin may be the smallest and the third margin may be the largest of the first, second, and third margins.

According to a seventh aspect of the present disclosure, in the first aspect described above, the drive device may further include a control unit (e.g., ECU 111 in the above embodiment) configured to control the boosting unit such that the voltage point is within a region that satisfies all the first, second, and third conditions.

A transport apparatus according to an eighth aspect of the present disclosure includes the drive device according to the first aspect described above.

A control method according to a ninth aspect of the present disclosure is a control method in a drive device including a first energy storage (e.g., high-power battery ES-P in the above embodiment), a second energy storage (e.g., high-capacity battery ES-E in the above embodiment) superior to the first energy storage in energy to weight density and inferior to the first energy storage in power to weight density, a boosting unit (e.g., VCU 101 in the above embodiment) configured to boost an output voltage of the first energy storage to perform power distribution control, and a motor (e.g., motor generator MG in the above embodiment) driven by power obtained from at least one of the first energy storage and the second energy storage. In a two-dimensional coordinate system using a voltage of the first energy storage and a voltage of the second energy storage as variables, a voltage point representing a relationship between the voltage of the first energy storage and the voltage of the second energy storage is within a region that satisfies all the following conditions: a first condition (e.g., first absolute limiting condition in the above embodiment) which is that the voltage of the second energy storage does not exceed a withstand voltage limit of the motor, a second condition (e.g., second absolute limiting condition in the above embodiment) which is that the voltage of the second energy storage is lower than or equal to a value obtained by the boosting unit by multiplying the voltage of the first energy storage by a maximum boosting ratio, and a third condition (e.g., third absolute limiting condition in the above embodiment) which is that the voltage of the second energy storage is higher than or equal to a value obtained by the boosting unit by multiplying the voltage of the first energy storage by a minimum boosting ratio.

According to the first, eighth, and ninth aspects of the present disclosure, the voltage point representing the relationship between the voltage of the first energy storage and the voltage of the second energy storage is within the region that satisfies all the first to third conditions in the controllable zone. Thus, even when the first energy storage and the second energy storage are charged an discharged, it is possible to restrict the movement of the voltage point representing the relationship between the voltage of the first energy storage and the voltage of the second energy storage, from the controllable zone to an uncontrollable zone. Therefore, even when these two energy storages are charged and discharged, it is possible to ensure the capability to establish control related to the charge and discharge of the two energy storages. When the voltage point is within the region that satisfies all the first to third conditions, the first energy storage can exchange power with the second energy storage and the motor through the boosting unit. Thus, control related to charge and discharge is established, which takes advantage of the different characteristics of the first energy storage and the second energy storage.

According to the second aspect of the present disclosure, the capability to establish control related to charge and discharge of the two energy storages can be ensured by taking into account the capability of the control unit to establish control over the boosting unit.

According to the third aspect of the present disclosure, the capability to establish control related to charge and discharge of the two energy storages can be ensured by taking into account the minimum boosting ratio which is greater than one and inevitably produced by variation of the boosting unit associated with the boosting ratio.

According to the fourth aspect of the present disclosure, the first energy storage and the second energy storage are selected such that the voltage point representing the relationship between the voltage of the first energy storage and the voltage of the second energy storage is within the region located inside (and around the center of) the controllable zone and satisfying all the first to third recommended conditions defined by adding margins to the first to third conditions. Therefore, even when the voltage point representing the relationship between the voltage of the first energy storage and the voltage of the second energy storage moves from the controllable zone toward the uncontrollable zone, the margins set near the boundary between the controllable zone and the uncontrollable zone serve as a buffer to prevent entry into the uncontrollable zone. Thus, even when these two energy storages are charged and discharged, the capability to establish control related to the charge and discharge of the two energy storages can be more reliably ensured.

According to the fifth aspect of the present disclosure, the capability to establish control related to charge and discharge of the two energy storages can be appropriately ensured by taking into account the tendency of movement of the voltage point from "before" to "after" charge and discharge.

According to the sixth aspect of the present disclosure, the margins are appropriately set by taking into account the tendency of movement of the voltage point from "before" to "after" charge and discharge. Thus, the capability to establish control related to charge and discharge of the two energy storages can be more appropriately ensured.

According to the seventh aspect of the present disclosure, the control unit controls the power distribution control performed by the boosting unit, such that the voltage point is within the region satisfying all the three conditions. Therefore, even when the first energy storage and the second energy storage are charged and discharged, it is possible to restrict the movement of the voltage point from the controllable zone to the uncontrollable zone.

Obviously, numerous modifications and variations of the present invention are possible in light of the above teachings. It is therefore to be understood that within the scope of the appended claims, the invention may be practiced otherwise than as specifically described herein.

What is claimed is:

1. A drive device comprising:
   a first energy storage;
   a second energy storage superior to the first energy storage in energy to weight density and inferior to the first energy storage in power to weight density;
   a boosting unit configured to boost an output voltage of the first energy storage to perform power distribution control; and
   a motor driven by power obtained from at least one of the first energy storage and the second energy storage,
   wherein in a two-dimensional coordinate system using a voltage of the first energy storage and a voltage of the second energy storage as variables, a voltage point representing a relationship between the voltage of the first energy storage and the voltage of the second energy storage is within a region that satisfies all the following conditions:
   a first condition which is that the voltage of the second energy storage does not exceed a withstand voltage limit of the motor;
   a second condition which is that the voltage of the second energy storage is lower than or equal to a value obtained by the boosting unit by multiplying the voltage of the first energy storage by a maximum boosting ratio; and
   a third condition which is that the voltage of the second energy storage is higher than or equal to a value obtained by the boosting unit by multiplying the voltage of the first energy storage by a minimum boosting ratio.

2. The drive device according to claim 1, further comprising a control unit configured to control the boosting unit, wherein the maximum boosting ratio is a limit value at which a capability of the control unit to establish control over the boosting unit can be ensured.

3. The drive device according to claim 1, wherein further comprising:
   a first sensor configured to detect the voltage of the first energy storage; and
   a second sensor configured to detect a value obtained by the boosting unit by boosting the voltage of the first energy storage,
   wherein the minimum boosting ratio is a value based on a product tolerance of the boosting unit and detection errors of the first sensor and the second sensor.

4. The drive device according to claim 1, wherein the voltage point representing the relationship between the voltage of the first energy storage and the voltage of the second energy storage is within a region that satisfies all the following conditions:
   a first recommended condition which is that the voltage of the second energy storage is lower than or equal to a value obtained by setting a first margin with respect to the first condition;
   a second recommended condition which is that the voltage of the second energy storage is lower than or equal to a value obtained by setting a second margin with respect to the second condition such that the boosting ratio of the boosting unit is decreased; and
   a third recommended condition which is that the voltage of the second energy storage is higher than or equal to a value obtained by setting a third margin with respect to the third condition such that the boosting ratio of the boosting unit is increased.

5. The drive device according to claim 4, wherein the first margin, the second margin, and the third margin differ in size.

6. The drive device according to claim 5, wherein the first margin is the smallest and the third margin is the largest of the first, second, and third margins.

7. The drive device according to claim 1, further comprising a control unit configured to control the boosting unit such that the voltage point is within a region that satisfies all the first, second, and third conditions.

8. A transport apparatus comprising the drive device according to claim 1.

9. The drive device according to claim 1, further comprising a controller to control the booster such that the first voltage and the second voltage satisfy the conditions.

10. An energy storage control method for a drive device including:
    a first energy storage;
    a second energy storage superior to the first energy storage in energy to weight density and inferior to the first energy storage in power to weight density;
    a boosting unit configured to boost an output voltage of the first energy storage to perform power distribution control; and
    a motor driven by power obtained from at least one of the first energy storage and the second energy storage,
    wherein in a two-dimensional coordinate system using a voltage of the first energy storage and a voltage of the second energy storage as variables, a voltage point representing a relationship between the voltage of the first energy storage and the voltage of the second energy storage is within a region that satisfies all the following conditions:
    a first condition which is that the voltage of the second energy storage does not exceed a withstand voltage limit of the motor;
    a second condition which is that the voltage of the second energy storage is lower than or equal to a value obtained by the boosting unit by multiplying the voltage of the first energy storage by a maximum boosting ratio; and
    a third condition which is that the voltage of the second energy storage is higher than or equal to a value obtained by the boosting unit by multiplying the voltage of the first energy storage by a minimum boosting ratio.

11. A drive device comprising:
    a first energy storage;
    a second energy storage which is superior to the first energy storage in energy to weight density and which is inferior to the first energy storage in power to weight density;

a motor to be driven with power supplied from at least one of the first energy storage and the second energy storage; and a booster to boost a first voltage output from the first energy storage such that the first voltage and a second voltage output from the second energy storage satisfy conditions comprising:

a first condition in which the second voltage does not exceed a withstand voltage limit of the motor;

a second condition in which the second voltage is lower than or equal to a maximum boosted value to which the booster boosts the first voltage with a maximum boosting ratio; and a third condition in which the second voltage is higher than or equal to a minimum boosted value to which the booster boosts the first voltage with a minimum boosting ratio.

12. The drive device according to claim 11, further comprising a controller to control the booster, wherein the maximum boosting ratio is a maximum value at which a capability to establish control over the booster is ensured.

13. The drive device according to claim 11, further comprising:

a first sensor to detect the first voltage; and a second sensor to detect a value to which the first voltage is boosted by the booster, wherein the minimum boosting ratio is a value based on a product tolerance of the booster and detection errors of the first sensor and the second sensor.

14. The drive device according to claim 11, the conditions further comprising:

a first additional condition in which the second voltage is lower than or equal to a value obtained by subtracting a first margin from the withstand voltage limit of the motor;

a second additional condition in which the second voltage is lower than or equal to a value obtained by subtracting a second margin from the maximum boosted value; and a third additional condition in which the second voltage is higher than or equal to a value obtained by adding a third margin to the minimum boosted value.

15. The drive device according to claim 14, wherein the first margin, the second margin, and the third margin differ in size.

16. The drive device according to claim 15, wherein the first margin is the smallest of the first, second, and third margins, and the third margin is the largest of the first, second, and third margins.

17. A transport apparatus comprising the drive device according to claim 11.

18. An energy storage control method for a drive device comprising:

boosting a first voltage output from a first energy storage such that the first voltage and a second voltage output from a second energy storage satisfy conditions comprising:

a first condition in which the second voltage does not exceed a withstand voltage limit of a motor to be driven with power supplied from at least one of the first energy storage and the second energy storage;

a second condition in which the second voltage is lower than or equal to a maximum boosted value to which the first voltage is boosted with a maximum boosting ratio; and a third condition in which the second voltage is higher than or equal to a minimum boosted value to which the first voltage is boosted with a minimum boosting ratio.

* * * * *